United States Patent
Wright et al.

(10) Patent No.: US 7,423,583 B2
(45) Date of Patent: *Sep. 9, 2008

(54) METHOD FOR REFINING STATE ESTIMATES OF A GLOBAL POSITIONING SYSTEM (GPS) RECEIVER BASED UPON SEQUENTIAL GPS CARRIER PHASE MEASUREMENTS

(75) Inventors: James R. Wright, Morgantown, PA (US); William A. Chuba, Downingtown, PA (US); Richard S. Hujsak, Exton, PA (US)

(73) Assignee: Analytical Graphics, Inc., Exton, PA (US)

( * ) Notice: Subject to any disclaimer, the term of this patent is extended or adjusted under 35 U.S.C. 154(b) by 144 days.

This patent is subject to a terminal disclaimer.

(21) Appl. No.: 11/335,245

(22) Filed: Jan. 19, 2006

(65) Prior Publication Data

US 2007/0024496 A1    Feb. 1, 2007

Related U.S. Application Data

(63) Continuation of application No. 11/140,296, filed on May 27, 2005, now Pat. No. 7,050,002.

(51) Int. Cl.
   *H04B 7/185*    (2006.01)
   *G01S 5/02*    (2006.01)
(52) U.S. Cl. .............................. 342/357.02; 342/357.12
(58) Field of Classification Search ............ 342/357.02, 342/357.05, 357.06, 357.12; 701/207, 213, 701/215
See application file for complete search history.

(56) References Cited

U.S. PATENT DOCUMENTS

| | | | | |
|---|---|---|---|---|
| 5,467,282 | A | * | 11/1995 | Dennis ........................ 701/215 |
| 7,050,002 | B1 | * | 5/2006 | Wright et al. .......... 342/357.02 |
| 7,102,563 | B2 | * | 9/2006 | Rapoport et al. ....... 342/357.04 |

OTHER PUBLICATIONS

James R. Wright, "Sherman's Theorem: Solutions to Multidimensional Nonlinear Real-Time Problems." Paper AAS 05-451, presented at the Malcolm D. Shuster Astronautics Symposium, Jun. 13, 2005. Printed by American Astronautical Society, Springfield, VA.

(Continued)

*Primary Examiner*—Dao L Phan
(74) *Attorney, Agent, or Firm*—Roberts Mardula & Wertheim, LLC

(57) ABSTRACT

Sequential GPS Doppler carrier phase count measurements are used for precision sequential determination of position and velocity of a GPS receiver, such as for orbit determination and geolocation, with minimum throughput time. Real-time orbit determination and geolocation performance is enabled with an optimal sequential filter, and near-real-time performance is enabled with an optimal fixed-lag smoother. Many problems associated with prior art orbit determination are eliminated by addressing the "cycle slip" problem, the unknown initial range problem with $RANGE^{CP}$ measurement representations, the problem of serial correlation in the measurements due to reprocessing of overlapping thermal noise. Also, the present invention significantly attenuates the carrier signal phase variation due to rotation of receiver antenna relative to transmitter antenna because the sequential phase count time intervals are sufficiently short.

5 Claims, 3 Drawing Sheets

OTHER PUBLICATIONS

Mark L. Psiaki and Shan Mohiuddin, "Modeling, Analysis, and Simulation of GPS Carrier Phase for Spacecraft Relative Navigation." Aug. 11, 2005. Printed by American Institute of Aeronautics and Astronautics, Reston, VA.

G. Lachapelle, "Carrier Phase Measurements Characteristics and Utilization Overview", Presentation at Univ. of Minn. IMA Workshop on Mathematical Challenges in GPS, Aug. 16-18, 2000.

James R. Wright, "Optimal Orbit Determination." 2002: Printed by the American Astronautical Society, Springfield, VA.

Bradford W. Parkinson and James J. Spilker. Global Positioning System: Theory and Applications, vol. I, pp. 286-287. 1996: American Institute of Aeronautics and Astronautics, Reston, VA.

Elliott D. Kaplan, editor. Understanding GPS: Principles and Applications, Chapter 5. 1996: Artech House.

* cited by examiner

Meas. No.
1 
2 
3 
4 
Figure 1A - Sequential Time Intervals
Meas. No.
1 
2 
3 
4 
Figure 1B - Overlapping Time Intervals
(Prior Art)

METHOD FOR REFINING STATE ESTIMATES OF A GLOBAL POSITIONING SYSTEM (GPS) RECEIVER BASED UPON SEQUENTIAL GPS CARRIER PHASE MEASUREMENTS

CROSS-REFERENCE TO RELATED APPLICATIONS

This application is a continuation of prior application Ser. No. 11/140,296, filed May 27, 2005 now U.S. Pat. No. 7,050,002, which is hereby incorporated by reference.

BACKGROUND OF THE INVENTION

The GPS (Global Positioning System) consists, in part, of a constellation of NAVSTAR (Navigation System with Timing And Ranging) spacecraft with transmitters that continuously broadcast L-BAND radio carrier signals on two frequencies. NAVSTAR spacecraft all have near-circular orbits with radial distances that are 4.16 Earth radii from Earth center, with heights of 20182 km above the Earth's surface. With orbit period of 717.957 minutes and inclination to Earth's equator of 55 degrees, each NAVSTAR completes two orbits about the Earth in one sidereal day (a sidereal day is defined by one complete rotation of the Earth relative to the mean locations of a particular ensemble of stars, or to a particular ensemble of quasars. A solar day has 1440 minutes). NAVSTAR radio transmissions are directed towards the Earth.

USER spacecraft employ GPS receivers, and for most effective receipt of NAVSTAR radio transmissions, have orbits with radial distances that are significantly less than 4.16 Earth radii from Earth center. The large existing class of spacecraft in Low Earth Orbit (LEO) have radial distances that are in the neighborhood of 1.1 Earth radii from Earth center, with heights of roughly 600 km above the Earth's surface (a height of 637.81 km goes with radial distance of 1.1000 er). The orbits of USER spacecraft are estimated by processing measurements derived from NAVSTAR radio signals with the aid of GPS receivers. That is, GPS measurements are used for orbit determination of USER spacecraft equipped with GPS receivers.

Also, Earth-fixed GPS receivers are placed at unknown locations and are activated to collect GPS measurements. These are used to estimate the Earth-fixed receiver locations. We refer to this capability as geolocation.

There are two very different types of measurements derived from the NAVSTAR L-BAND radio carrier signals, namely: (i) pseudo-range measurements and (ii) Doppler carrier phase count measurements. Doppler carrier phase count measurements provide Doppler information on the relative velocity of USER spacecraft with respect to NAVSTAR spacecraft. This enables much more precise orbit estimates and geolocation estimates than those that process pseudo-range measurements only. The present invention refers to USER orbit determination and/or geolocation by processing Doppler carrier phase count measurements, not by processing pseudo-range measurements.

Measurement Representations

All methods of precise orbit determination and geolocation map measurement residuals linearly to state estimate corrections. A measurement residual is the difference between a measurement produced by receiver hardware and the estimated representation of the measurement derived from a state estimate—calculated on a computer. The measurement representation is critical to precise orbit determination and geolocation. In one aspect, the present invention refers most significantly to an improvement of the estimated representation of Doppler carrier phase count measurements.

Geodesy and Geophysics

Orbit determination of USER spacecraft, and geolocation of ground-fixed receivers, has been performed for several decades by processing GPS Doppler carrier phase count measurements. This has been particularly relevant for geodesy and geophysics, and very significant progress has been thereby achieved. But the measurement representations currently used in orbit determination and geolocation capabilities for geodesy and geophysics are fraught with serious problems, needlessly so. The Doppler carrier phase measurement is represented as a range measurement with unknown initial range. How can this be?

Every rigorous measurement representation equation for Doppler carrier phase is composed of several additive terms on the right, with the measurement representation on the left. Some terms on the right are characterized by signal, and some are characterized by noise. One of the terms for signal is called range-difference, or delta-range. This difference is: range at the end of the Doppler carrier phase count interval less range at the beginning of the Doppler carrier phase count interval, where range is a measure of distance between NAVSTAR transmitter and USER GPS receiver. One can rearrange the measurement representation equation so that the range-difference appears on the left, and is a function of the Doppler carrier phase measurement and other terms on the right. Algebraically one can then add the unknown range, at the beginning of the Doppler carrier phase count interval, to both sides of the equation. Now the sum of the unknown range on the left, at the beginning of the Doppler carrier phase count interval, and range-difference on the left defines the range at the end of the Doppler carrier phase count interval. That is, the modified equation presents the range at the end of the Doppler carrier phase measurement on the left as a function of the Doppler carrier phase measurement and the unknown range at the beginning of the Doppler carrier phase count interval, together with other terms, on the right. So orbit determination and geolocation for geodesy and geophysics treats the range at the end of the Doppler carrier phase count interval as the measurement, and requires an associated range measurement representation to form a measurement residual. This is how the Doppler carrier phase measurement is represented as a range measurement with unknown initial range. We shall call it the $RANGE^{CP}$ measurement representation, with the superscript CP meaning that $RANGE^{CP}$ is derived, in part, from a carrier phase measurement.

Further, the carrier phase measurements used for these range representations are overlapping measurements, not sequential measurements. This has a significant detrimental impact for orbit determination and geolocation, and is described below.

Presentation of Estimation Errors

The prior art geodesist presents small constant error magnitudes (i.e., those not derived directly from his state estimate error covariance matrix function) for his estimates of orbits and geolocations using overlapped $RANGE^{CP}$ measurements, and has apparently convinced some technical people of their validity. These small error magnitudes usually refer to position components only, a limited subset of any complete state estimate. The argument has been made that if the geodesist is doing so well, then his estimation technique must surely be correct.

An extensive survey of the relevant literature has failed to identify a single analysis of the state estimate error, including a realistic error covariance. In fact, these analyses do not exist because of limitations in the prior art, including but not limited to the use of overlapped carrier phase measurements.

Each and every technique (including prior art methods of batch least squares, sequential filtering, batch filtering, and sequential smoothing) used by the geodesist to calculate precision estimates also calculates an associated state estimate error covariance matrix, or its inverse, that is used intrinsically to calculate the estimates. If these estimates are optimal and appropriately validated estimates, then their associated state estimate error covariance matrices are realistic. Realistic state estimate error covariance matrices would be invaluable for interpretation and use of orbit and geolocation estimates, but they are never presented. They are never presented because they are always significantly unrealistic. This is frequently admitted and is a problem with the prior art. Credible validation techniques in support of realistic state estimate error covariance presentations cannot be found. The present inventors have looked for them and have asked for them in appropriate places, but they apparently do not exist.

GPS Doppler Carrier Phase Count Measurements

NAVSTAR L-BAND radio carrier signals with specified frequencies are generated by atomic clocks on board each NAVSTAR. When received by any GPS receiver, the frequencies of these signals are Doppler shifted according to the deterministic theory of special and general relativity. The Doppler shift is proportional to the velocity of the USER receiver with respect to the velocity of the NAVSTAR transmitter. Each GPS receiver has its own local clock, and it is designed to create a radio signal with approximately the same frequency as that transmitted by each NAVSTAR. The incoming NAVSTAR Doppler shifted signal to each GPS receiver is differenced with the local receiver signal to isolate the Doppler shift and thereby generate a differenced Doppler phase with Doppler frequency. The Doppler phase is counted by the GPS receiver across a time interval $[t_m; t_n]$ defined by the receiver clock, where $t_m < t_n$, and where m and n are time indices.

[00 sec,10 sec], [10 sec; 20 sec], [20 sec; 30 sec; 40 sec], . . . sequential

[00 sec,10 sec], [00 sec; 20 sec], [00 sec; 30 sec], [00 sec; 40 sec], . . . . overlapping Define $\tau_{mn} = t_n - t_m$. Two illustrative sequences of four time intervals are displayed here, where the first sequence has a constant $\tau_{mn} = 10$ seconds (the constant sequential value for $\tau_{mn}$ will be orbit dependant and relatively small as compared to orbit period) and is sequential, but the second sequence is overlapped with non-constant $\tau_{mn}$ expanding without bound with each measurement. Each overlapped time interval is the concatenation of a sequence of adjacent sequential time intervals.

FIGS. 1A and 1B have general applicability and distinguish the sequential and overlapped Doppler measurement time intervals graphically.

The phase count measurement $N_{mn}$ across each time interval $[t_m; t_n]$ is the sum of an integer number of cycles plus a partial cycle. Thus the GPS Doppler carrier phase count measurement $N_{mn}$ is a rational number (but typically not an integer), and has units of cycles. If the phase count time intervals are sequential, then the Doppler phase count measurements are sequential, non-overlapping, and $\tau_{mn}$ remains constant and small. But if the time intervals are overlapped, then the Doppler phase count measurements are overlapped, and $\tau_{mn}$ becomes indefinitely large. Each overlapped measurement is the sum of a sequence of adjacent sequential measurements.

Table 1 (sequential measurements) and Table 2 (overlapping measurements) present related examples (not that many other distinct and useful examples could be constructed and simplifications have been made for purposes of this example; ordinarily all calculations are performed in double precision to 15+decimals and time is represented in the Gregorian Calendar form or Julian Date) of simulated GPS Doppler carrier phase count measurement values for a GPS receiver on a spacecraft in LEO (Low Earth Orbit), referred to the same NAVSTAR transmitter. These tables are coordinated with the time intervals displayed above and with FIGS. 1A-1B. Columns 1, 2, 4, and 7 are the same for each table. Column 1 is time index, Column 2 is time t, Column 4 is range $\rho$, and Column 7 is the receiver phase count $N_{On}^R$. Columns 3, 5, and 6 are different for each table due to the distinction in measurement time interval differences $\tau_{mn}$. Column 3 is time interval difference $\tau_{mn}$, Column 5 is delta-range $\Delta\rho$, and Column 6 is the measurement: $N_{mn}$ for sequential measurement and $N_{On}$ for overlapping measurement.

TABLE 1

Sequential Doppler Carrier Phase Measurements

| index | t (sec) | $\tau_{mn}$ (sec) | $\rho$ (m) | $\Delta\rho$ (m) | $N_{mn}$ (cy) | $N_{On}^R$ (cy) |
|---|---|---|---|---|---|---|
| 0 | 00 | | 18632055.19 | | | 0.00 |
| | | 10 | | −955.17 | −5019.47 | |
| 1 | 10 | | 18631100.02 | | | −5019.47 |
| | | 10 | | −274.49 | −1442.44 | |
| 2 | 20 | | 18630825.53 | | | −6461.91 |
| | | 10 | | 406.08 | 2133.93 | |
| 3 | 30 | | 18631231.61 | | | −4327.98 |
| | | 10 | | 1086.39 | 5709.03 | |
| 4 | 40 | | 18632318.00 | | | 1381.05 |

The time-tag for each measurement is defined here to be the time at end of the Doppler count interval. Example for Table 1: For time interval $[t_m; t_n] = [20$ seconds; 30 seconds], and sequential measurement $N_{23} = 2133.93$ cycles, the time-tag $t_3 = 30$ seconds.

TABLE 2

Overlapped Doppler Carrier Phase Measurements

| index | t (sec) | $\tau_{mn}$ (sec) | $\rho$ (m) | $\Delta\rho$ (m) | $N_{On}$ (cy) | $N_{On}^R$ (cy) |
|---|---|---|---|---|---|---|
| 0 | 00 | | 18632055.19 | | | 0.00 |
| | | 10 | | −955.17 | −5019.47 | |
| 1 | 10 | | 18631100.02 | | | −5019.47 |
| | | 20 | | −1229.66 | −6461.91 | |
| 2 | 20 | | 18630825.53 | | | −6461.91 |
| | | 30 | | −823.58 | −4327.98 | |
| 3 | 30 | | 18631231.61 | | | −4327.98 |
| | | 40 | | 262.81 | 1381.05 | |
| 4 | 40 | | 18632318.00 | | | 1381.05 |

BRIEF SUMMARY OF THE INVENTION

The present invention provides precision sequential orbit determination with minimum throughput time using sequential GPS Doppler carrier phase count measurements. Real-time orbit determination performance is enabled with an optimal sequential filter, and near-real-time performance is enabled with an optimal fixed-lag smoother. The present invention eliminates many problems associated with prior art orbit determination by addressing the "cycle slip" problem, the unknown initial range problem with RANGE$^{CP}$ measurement representations, the problem of serial correlation in the measurements (due to reprocessing of overlapping thermal noise), and significantly attenuates the carrier signal phase variation (due to rotation of receiver antenna relative to transmitter antenna) because the sequential phase count time intervals are sufficiently short.

Construction of Sequential Doppler Phase Count Measurement Representations

Sequential Doppler phase count measurement representations are constructed:

1. to process sequential Doppler carrier phase count measurements according to the new representation given by Eq. 10 (natural units: cycles);
2. to rigorously present each Doppler carrier phase count measurement as a delta-range representation according to the new expression defined by Eq. 21 (derived units: meters);
3. to remove ionospheric effects with the two GPS L-BAND frequencies according to Eq. 22;
4. by choosing Eq. 6 rather than Eq. 8 for modeling USER clock phenomenology;
5. to remove USER spacecraft clock phenomenology with Doppler measurement differences referred to distinct NAVSTARs according to Eq. 30;
6. to remove effects of USER spacecraft clock frequency steering, when it exists, with Doppler measurement differences referred to distinct NAVSTARs according to Eq. 30; and
7. for processing in an optimal sequential filter, or optimal sequential fixed-lag smoother, with autonomous measurement editor.

Considered individually, elements (1), (2), and (4) are new and unique. Considered individually, different versions of elements (3), (5), and (6) have been used in previous orbit determination capabilities. The optimal sequential filter referred to in element (7) has been produced by Analytical Graphics Inc., of Malvern Pa. (AGI), the assignees of the present invention, and is in current use by AGI customers.

The optimal fixed-lag smoother referred to in element (7) has been designed by AGI, but has not yet been implemented. Since the new element (1) is embedded in elements (3), (5), and (6), they are new in an embedded sense. Taken together, this combination of seven elements defines a new capability to perform precision sequential orbit determination with minimum throughput time using sequential GPS Doppler carrier phase count measurements. Real-time orbit determination performance is enabled with an optimal sequential filter, and near-real-time performance is enabled with an optimal fixed-lag smoother.

As mentioned above, the "cycle slip" problem is eliminated, the unknown initial range problem with RANGE$^{CP}$ measurement representations is eliminated, serial correlation in the measurements (due to reprocessing of overlapping thermal noise) is eliminated, and the carrier signal phase variation (due to rotation of receiver antenna relative to transmitter antenna) is significantly attenuated because the sequential phase count time intervals are sufficiently short.

Elimination of the Cycle Slip Problem

The following example illustrates the cycle slip problem for overlapping measurements. Vast experience with overlapping measurements has shown the cycle slip problem to be a very significant problem in general. The present inventors submit, generally, that the processing of overlapping measurements is significantly inferior to the processing of sequential measurements by an optimal sequential filter.

EXAMPLE

From Table 1: At time-tag t=30 seconds, the sequential phase count measurement is $N_{23}$=2133.93 cycles, across time interval [20; 30] seconds.

From Table 2: At time-tag t=30 seconds, the overlapping phase count measurement is $N_{03}$=−4327.98 cycles, across time interval [00; 30] seconds.

Notice that: (−4327.98 cycles)=(−6461.91 cycles+2133.93 cycles), where (−4327.98 cycles) and (−6461.91 cycles) are overlapping measurements and (2133.93 cycles) is simultaneously a sequential measurement and a difference of overlapping measurements. These numbers represent valid measurements without cycle slip in this example; i.e., without loss of lock in the PLL (Phase Lock Loop).

Suppose now, as frequently happens with real data, that there is a loss of lock for sequential measurement $N_{23}$. That is, the receiver erroneously reports say $N_{23}$=10000.00 cycles, instead of the correct value $N_{23}$=2133.93 cycles for the sequential measurement. Then an erroneous overlapping measurement $N_{03}$ is reported as $N_{03}$=(−6461.91 cycles+10000.00 cycles)=(−3538.10 cycles), instead of the correct value $N_{03}$=(−4327.98 cycles).

Suppose further, as frequently happens, that the sequential measurement $N_{34}$=5709.03 cycles is reported correctly by the receiver. Then the overlapping incorrect measurement value $N_{04}$=(−3538.10 cycles+5709.03 cycles)=(2170.93 cycles) is reported by the receiver instead of the correct value of $N_{04}$=(1381.05 cycles). Sequential measurement $N_{34}$ is correct, but overlapping measurement $N_{04}$ is incorrect because overlapping measurement $N_{03}$ was incorrect.

Suppose further, as frequently happens, that sequential measurements $N_{45}$, $N_{56}$, $N_{67}$, ... following $N_{34}$ in this tracking pass, are reported correctly by the receiver. Then all overlapping measurements following $N_{04}$ will be reported incorrectly because they are additively chained to the incorrect overlapping measurement $N_{04}$. Overlapping measurements $N_{04}$, $N_{05}$, $N_{06}$, $N_{07}$, ... are useless.

Overlapping Measurements

There are two cases to consider for the response of any estimator to the overlapping measurements. (i) If the estimator has an effective measurement editor, then overlapping measurements $N_{04}$, $N_{05}$, $N_{06}$, $N_{07}$, ... will be appropriately discarded (note that this takes significant time in any operations) together with their associated measurement information, but (ii) If the estimator does not have an effective measurement editor, then some subset of the overlapping measurements $N_{04}$, $N_{05}$, $N_{06}$, $N_{07}$, ... will be accepted and processed for orbit determination. This will destroy the orbit estimate in the sense that the orbit estimate will incur very significant error.

In the first case the orbit estimate suffers a significant loss of information and is thereby degraded, and in the second case, the orbit estimate is destroyed. This is due to a cycle slip (loss of lock in the PLL) in a single sequential measurement $N_{23}$, and is referred to here as the cycle slip problem.

Sequential Measurements

Consider now the response of our optimal sequential filter to the sequential measurements: Erroneous measurement ($N_{23}$=10000.00 cycles) is rejected by the optimal sequential autonomous editor, but all other sequential measurements $N_{34}$, $N_{45}$, $N_{56}$, $N_{67}$, ... are accepted by the optimal sequential autonomous editor and appropriately used for sequential orbit determination. The only measurement information necessarily lost is that associated with measurement $N_{23}$. We refer to this as the elimination of the cycle slip problem.

The autonomous identification and rejection of any sequential carrier phase measurement that suffers loss of phase lock is accomplished in the following manner. Suppose a good sequential carrier phase measurement $y_k$ at time $t_k$ is used to correct the propagated a priori state estimate $X_{k|k-1}$ at time $t_k$ to calculate an improved state estimate $X_{k|k}$ at time $t_k$. Suppose the next measurement $y_{k+1}$ at time $t_{k+1}$ had a loss of phase lock, and is thus known to have a cycle slip. However, there is no way to determine that $y_{k+1}$ is a bad cycle-slipped measurement by looking solely at the carrier phase measurement value. Rather the state estimate $X_{k|k}$ and its realistic error covariance matrix $P_{k|k}$ is propagated to time $t_{k+1}$ to get $X_{k+1|k}$ and $P_{k+1|k}$, and $X_{k+1|k}$ is used to calculate a measurement representation $y(X_{k+1|k})$. The measurement residual $\Delta y_{k+1} = y_{k+1} - y(X_{k+1|k})$ is formed and the absolute value $|\Delta y_{k+1}|$ is compared to a threshold $T_{k+1}$ derived from $P_{k+1|k}$ and from the measurement error variance matrix $R_{k+1}$. If $|\Delta y_{k+1}| < T_{k+1}$, then measurement $y_{k+1}$ is accepted for processing by the optimal filter. But in the case of a cycle slip, we will find that $|\Delta y_{k+1}| \geq T_{k+1}$ and the measurement $y_{k+1}$ is therefore autonomously rejected in real time.

Suppose the next sequential measurement $y_{k+2}$ at time $t_{k+2}$ is a good measurement (no cycle slip). Then we will find $|\Delta y_{k+2}| < T_{k+2}$, and the measurement $y_{k+2}$ is accepted for processing by the filter.

The autonomous real-time identification and rejection of cycle slips in sequential carrier phase measurements is enabled with the autonomous sequential editor, sequential estimator, and realistic covariance function.

This autonomous identification and rejection of flawed data is impossible with overlapped carrier phase measurements. A batch of overlapped carrier phase measurements are processed simultaneously with a batch estimator that prohibits autonomous editing, prohibits use of a realistic state error covariance function, and requires significant time to repair the damage done by a single sequential cycle slip.

Elimination of the Measurement Serial Correlation Problem

The processing of sequential measurements, in preference to overlapping measurements, eliminates the repeated exposure to the same thermal noise in the overlapping measurements that generates the serial correlation.

Elimination of the Unknown Initial Range Problem

Given only the GPS Doppler carrier phase count measurements $N_{mn}$ and $N_{0n}$ and their time-tags $t_n$, all values of range $\rho_n$ are unknown (the values of GPS pseudo-range have error magnitudes significantly larger than those of $\Delta \rho_{mn}$, derived from Doppler phase count). However, the range-difference $\Delta \rho_{mn}$, or delta-range, can be calculated from $N_{mn}$ according to Eq. 21, and $\Delta \rho_{0n}$ can be calculated from $N_{0n}$, also according to Eq. 21. From the definition of $\Delta \rho_{0n}$:

$$\Delta \rho_{0n} = \rho_n - \rho_0$$

That is:

$$\rho_n = \rho_0 + \Delta \rho_{0n} \quad (1)$$

for $n \in \{1, 2, \ldots\}$. We shall refer to $\rho_0$ as the unknown initial range. Given the calculation of $\Delta \rho_{0n}$ from measurements $N_{0n}$ for $n \in \{1, 2, \ldots\}$, each unknown range $\rho_n$ is treated by the geodesist as though it were a measurement, for $n \in \{1, 2, \ldots\}$, with unknown initial range $\rho_0$. We refer to $\rho_n$ above as $\rho_n = \text{RANGE}^{CP}$.

The Unknown Initial Range Problem has three components: Communication, Estimation, and Throughput.

Communication

By definition, a measurement is a known value of an object or quantity determined by measuring it, but $\rho_n = \text{RANGE}^{CP}$ is not measured and is not known. We have multiple contradictions ($n \in \{1, 2, \ldots\}$) because the $\rho_n = \text{RANGE}^{CP}$ are called measurements by the geodesist when they are not measurements. This is a problem in communication.

Estimation

From Eq. 1, we see that $\rho_0$ and $\Delta \rho_{0n}$ have distinct time-tags $t_0$ and $t_n > t_0$. The unknown initial range $\rho_0$ is estimated, together with orbit parameters and other state parameters, from measurements $N_{0n}$. But the execution of a state error transition function between times $t_0$ and $t_n$ is required for each $\Delta \rho_{0n}$ to perform the estimation. The state error matrix includes errors on orbit parameters and errors on $\rho_0$. Significant cross correlations between orbit errors and errors on $\rho_0$ alias orbit errors and other state estimate errors into $\rho_0$ and thereby into $\rho_n$ via Eq. 1. Conversely, errors on $\rho_0$ are aliased into orbit errors and other state estimate errors.

Orbit errors are due, in significant part, to force modeling errors. Thus $\rho_0$, $\rho_n$, orbit errors, force modeling errors, and other state estimate errors are mutually contaminated. The geodesist wants to call $\rho_n = \text{RANGE}^{CP}$ a measurement. Then his measurement modeling errors include orbit errors, force modeling errors, and other state estimate errors. This is a serious estimation problem where measurement errors are confused with, and not distinguished from, force modeling errors.

The estimation of $\rho_0$ must occur at its epoch to, but the geodesist prefers to ignore this fact and refers to $\rho_0$, implicitly and incorrectly, as a bias without epoch, to be estimated as an arbitrary constant. These estimation problems are serious.

Throughput

If one appropriately refers $\rho_0$ to its epoch to for estimation, then $\Delta \rho_{0n} = t_n - t_0$ becomes large, and the propagation of state estimate and estimate error covariance matrix between times $t_0$ and $t_n$ for each $\rho_n$ consumes extremely excessive CPU time. This is a throughput problem that destroys, or degrades, any attempt to provide real-time state estimation.

Elimination

All three components of the Unknown Initial Range Problem are eliminated by processing sequential Doppler carrier phase count measurements $N_{mn}$ with an optimal sequential filter, in preference to estimation of $\rho_0$ and calculation of $\rho_n$ via Eq. 1 for use as pseudo-measurements.

BRIEF DESCRIPTION OF THE DRAWINGS

FIG. 1 illustrates graphically examples of sequential and overlapping time intervals for GPS Doppler phase count measurements;

DETAILED DESCRIPTION OF THE INVENTION

One Embodiment of the Present Invention

Sequential Doppler Phase Count Measurement Representations

Figure 2:
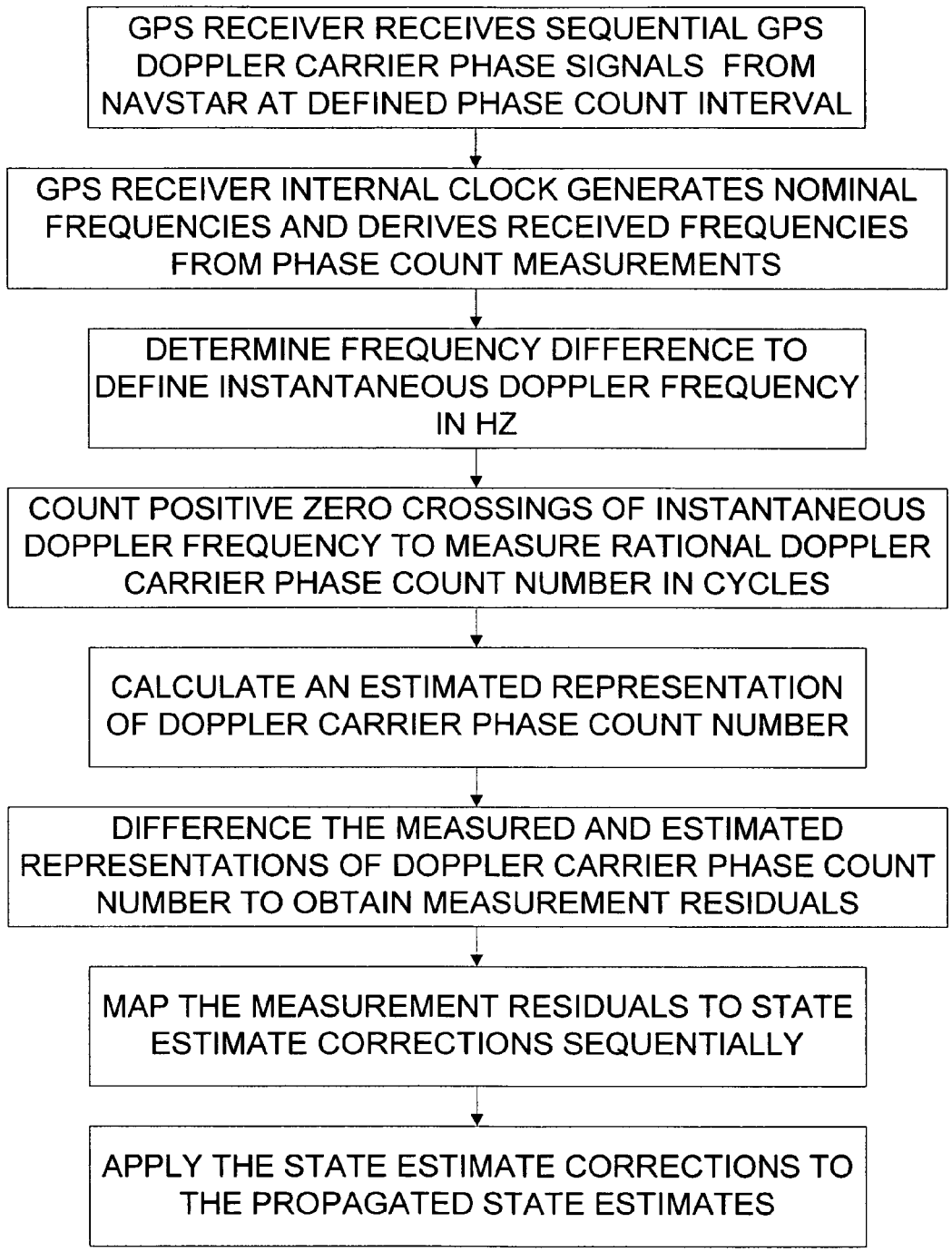
FIG. 2 illustrates a flow chart of an embodiment of the process of the present invention.
Figure 3:
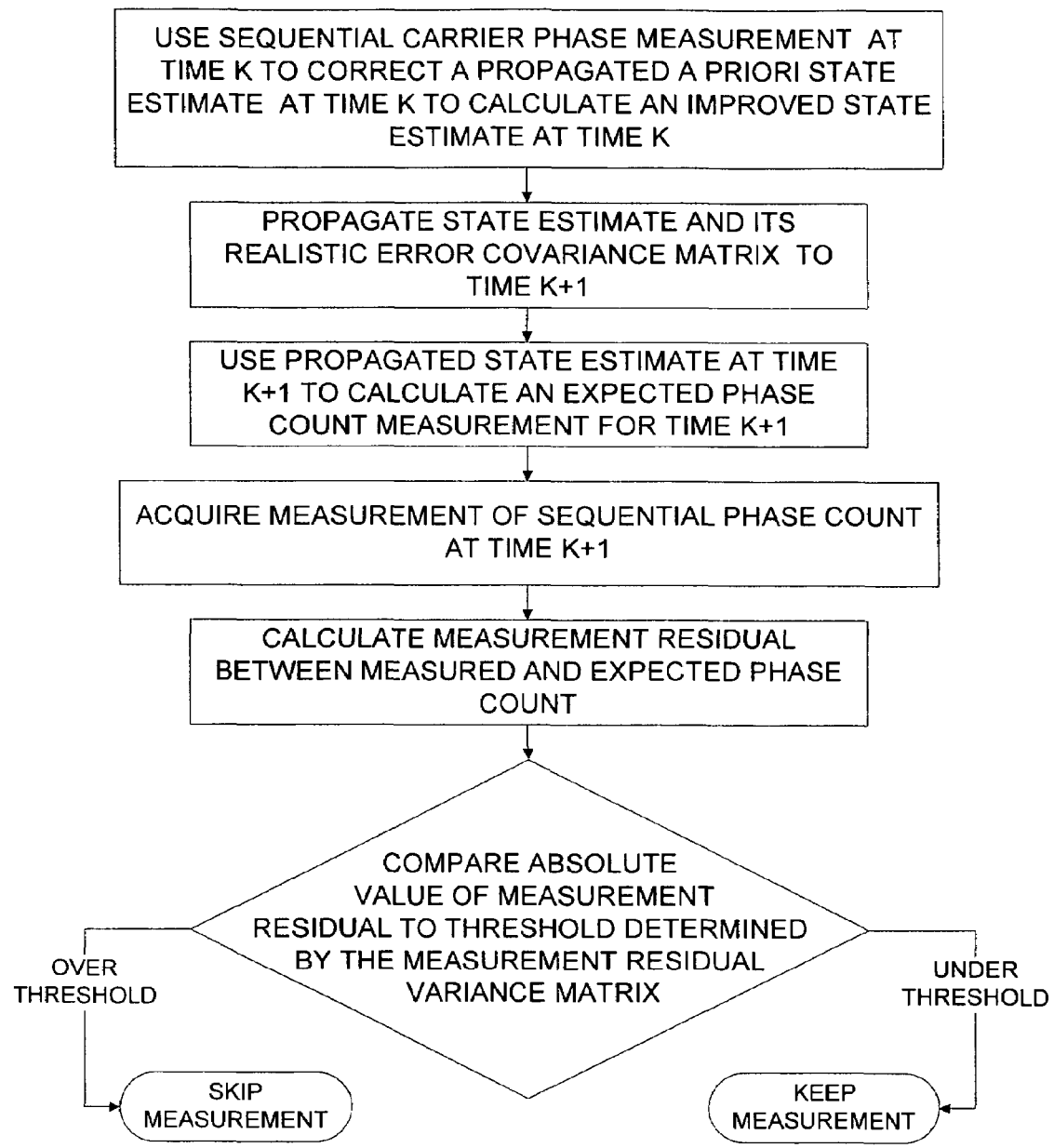
FIG. 3 illustrates a flow chart for autonomous real-time identification and rejection of cycle slips in accordance with the present invention.

The transmitter on each GPS spacecraft (NAVSTAR) emits radio carrier signals at two L-BAND frequencies $f_n^{NV}$ (NV indicates NAVSTAR and n is an integer denoting frequency, either 1 or 2). A USER spacecraft with GPS receiver detects radio carrier signals that are Doppler shifted with multiplicative Doppler shift $\beta_{ij}$, and are contaminated by random additive ionospheric effects $\delta f_n^{ION}$. Thus the USER spacecraft receives radio carrier signals with frequency $\beta_{ij} f_n^{NV} + \delta f_n^{ION}$. The USER receiver knows the nominal transmitted frequency $\bar{f}_n^{NV}$ and (using its own clock) approximates the received radio carrier signal with frequency $f_n^U$. A frequency difference is represented by the USER receiver to define (i.e., the subtraction order is defined by each actual receiver, and so our representation here may need a sign change for some receivers) the instantaneous Doppler frequency $f_n^D$:

$$f_n^D = f_n^U - (\beta_{ij} f_n^{NV} + \delta f_n^{ION}) \qquad (2)$$

with units cycles/second. Positive zero crossings (cycles) of $f^D$ are counted and summed (integrated) by the USER receiver, inclusive of a partial cycle, across a USER defined phase count interval $\Delta t$ to construct a rational phase count number $N_j^{ni}$. Thus $N_j^{ni}$ consists of the sum of an integer number of cycles and a partial cycle. The GPS receiver phase lock loop incurs random thermal noise (Gaussian white noise) $\delta N_j^{ni}$, independent for each NAVSTAR link i, and independent at each measurement time-tag $t_j$. Thus $N_j^{ni}$ has a representation with the sum (generalized integral):

$$N_j^{ni} = \int_{j-\Delta t}^{j} f_n^D \, dt + \delta N_j^{ni} \qquad (3)$$

The GPS sequential carrier phase measurement $N_j^{ni}$ is defined by Eqs. 2 and 3, and has units in cycles.

Thermal Noise Serial Correlation

It is important to notice that when sequential measurements are processed by any orbit determination algorithm, there is no serial correlation due to thermal noise $\delta N_j^{ni}$.

Random Clock Sampling Error

There exists a clock sampling error that generates a serial correlation coefficient value of 0.5 between each pair of sequential adjacent Doppler carrier phase count measurements. However, this correlation does not exist between measurements that are non-adjacent, and is therefore non-observable to the sequential estimator. Non-observable effects have no influence on the sequential estimator.

Calculation of Sequential Doppler Phase Count Measurement Representations

Referring now to Eq. 2, recall that NAVSTAR clock phenomenology is embedded in $f_n^{NV}$, and USER clock phenomenology is embedded in $f_{n_U}$. An explicit relation between $f_n^U$ and $f_n^{NV}$ is required, so define:

$$\delta f_n^U = f_n^U - f_n^{NV} \qquad (4)$$

We wish to embed $\delta f_n^U$ into Eq. 1 in order to identify $\delta f_n^U$ explicitly in the Doppler frequency $f_n^D$. From Eq. 4 we can write:

$$f_n^U = f_n^{NV} + \delta f_n^U \qquad (5)$$

and insert $f_n^U$ into Eq. 2 to get:

$$f_n^D = f_n^{NV}(1-\beta_{ij}) + \delta f_n^U - \delta f_n^{ION} \qquad (6)$$

or we can write:

$$f_n^{NV} = f_n^U - \delta f_n^U \qquad (7)$$

and insert $f_n^{NV}$ into Eq. 2 to get:

$$f_n^D = f_n^U(1-\beta_{ij}) + \beta_{ij}\delta f_n^U - \delta f_n^{ION} \qquad (8)$$

The instantaneous Doppler frequency $f_n^D$ has different representations, that are defined by Eq. 6 and that are defined by Eq. 8. We shall return to this apparent ambiguity later.

Ionosphere

The ionospheric perturbation $\delta f_n^{ION}$ contained in the Doppler frequency $f_n^D$ has the representation:

$$\delta f_n^{ION} = -\left[\frac{1.344536 \times 10^{-7}}{f_n}\left(\frac{(Hz)(cycles)}{TECN}\right)\right] \qquad (9)$$

$$\left[\frac{dN_{TEC}}{dt}\right]$$

where the total electron content $N_{TEC}$ is the integral of electron density along the path of the radio signal from transmitter to receiver, where $f_n$ is evaluated in units Hz, $dN_{TEC}/dt$ is evaluated in units TECN/s, and where 1 TECN=1 electron/m$^2$. Then $\delta f_n^{ION}$ has units of Hz.

Sequential Doppler Carrier Phase Count Measurement Representation for $N_j^{ni}$ To find the representation for $N_j^{ni}$, insert Eq. 6 (this choice as opposed to Eq. 8 will be explained later) into Eq. 3 using Eq. 9:

$$N_j^{ni} = \bar{f}_n^{NV}(\zeta_{ij} + I_j^{nNi}) + \bar{f}_n^U I_j^{nU} + \qquad (10)$$
$$A\Delta N_{TEC}/\lfloor c\bar{f}_n^{NV}\rfloor + \delta N_j^{ni}$$

where:

$$\zeta_{ij} = \int_{t_j-\Delta t}^{t_j}(1-\beta)\,dt = \Delta\rho_{ij}/c - \chi_{ij} \qquad (11)$$

$$\chi_{ij} = \int_{t_j-\Delta t}^{t_j}\left\{\frac{\mu}{c^2}\left[\frac{1}{r_j} - \frac{1}{R_i}\right] + \frac{1}{2c^2}[\dot{s}_j^2 - \dot{S}_i^2]\right\}dt \qquad (12)$$

$$\Delta\rho_{ij} = \int_{t_j-\Delta t}^{t_j}\dot{\rho}_{ij}\,dt = \rho_{ij}(t_j) - \rho_{ij}(t_j-\Delta t) \qquad (13)$$

$$\Delta N_{TEC} = N_{TEC}(t_j) - N_{TEC}(t_j - \Delta t) \qquad (14)$$

$$A = 40.30816(m^3 Hz^2/electron) \qquad (15)$$

$$\beta_{ij} = 1 - \frac{1}{c}\dot{\rho}_{ij} + \frac{\mu}{c^2}\left[\frac{1}{r_j} - \frac{1}{R_i}\right] + \frac{1}{2c^2}[\dot{s}_j^2 - \dot{S}_i^2] \qquad (16)$$

$$I_j^{nNi} = \int_{t_j-\Delta t}^{t_j}\left[\frac{\delta f_n^N}{\bar{f}_n^N}\right](1-\beta_{ij})dt \qquad (17)$$

$$I_j^{nU} = \int_{t_j-\Delta t}^{t_j}\left[\frac{\delta f_n^U}{\bar{f}_n^U}\right]dt \qquad (18)$$

where:

$\delta N_j^{ni}$ is receiver thermal noise, independent for each NAVSTAR i c is speed of light in a vacuum $\mu$ is the geocentric two-body gravitational constant $r_j$ and $\dot{s}_j$ are magnitudes of USER spacecraft position and velocity vectors at time $t_j$ $R_i$ and $\dot{S}_i$ are magnitudes of NAVSTAR spacecraft position and velocity vectors at time $t_i$ $\dot{\rho}_{ij}$ is the range-rate $\dot{\rho}_{ij} = d\rho_{ij}/dt$ at time $t=t_j$ $\rho_{ij}$ is the range between NAVSTAR spacecraft at time $t_i$ and USER spacecraft at time $t_j$ In an alternate representation, Eq. 10 can also be written:

$$N_j^{ni} = \left(\frac{1}{\lambda_n}\right)\left\{\Delta\rho_{ij} - c\chi_{ij} + c[I_j^{nNi} + I_j^{nU}] + \left[\frac{A\Delta N_{TEC}}{(\bar{f}_n^{NV})^2}\right]\right\} + \delta N_j^{ni} \quad (19)$$

where:

$$\lambda_n \bar{f}_n^{NV} = c \quad (20)$$

$$\lambda_1 = 19.029367 \frac{cm}{cycle}$$

$$\lambda_2 = 24.42102 \frac{cm}{cycle}$$

Then solve Eq. 19 for $\Delta\rho_{ij}$ to write:

$$\Delta\rho_{ij} = \lambda_n(N_j^{ni} - \delta N_j^{ni}) + c(\chi_{ij} - [I_j^{nNi} + I_j^{nU}]) - A\Delta N_{TEC}/(\bar{f}_n^{NV})^2 \quad (21)$$

Eq. 21 is useful for representation of $\Delta\rho_{ij}$ from that of $N_j^{ni}$.

Two-Frequency Ionosphere Removal

For two-frequency ionosphere removal, let $N_j^{Ei}$ be defined by:

$$\bar{N}_j^{Ei} = \frac{\bar{f}_1^{NV} N_j^{1i} - \bar{f}_2^{NV} N_j^{2i}}{\bar{f}_1^{NV} - \bar{f}_2^{NV}} = \frac{\gamma N_j^{1i} - N_j^{2i}}{\gamma - 1} \quad (22)$$

where:

$$\gamma = \bar{f}_1^{NV} / \bar{f}_2^{NV} \quad (23)$$

For orbit determination, use the representation $\bar{N}_j^{Ei}$:

$$\bar{N}_j^{Ei} = \frac{\bar{f}_1^{NV} H_j^{1i} - \bar{f}_2^{NV} H_j^{2i}}{\bar{f}_1^{NV} - \bar{f}_2^{NV}} \quad (24)$$

where:

$$H_j^{ni} = \bar{f}_n^{NV} \zeta_{ij} + I_j^{nNi} + I_j^{nU} + \delta N_j^{ni} \quad (25)$$

It is straightforward to demonstrate that ionospheric terms are eliminated due to use of Eqs. 22 and 24.

With respect to ionospheric wave length, Eq. 22 can be written:

$$N_j^{Ei} = \frac{\lambda_2 N_j^{1i} - \lambda_1 N_j^{2i}}{\lambda_2 - \lambda_1} \quad (26)$$

where $\lambda_n f_n = c$. Insert Eq. 19 into Eq. 26 and define:

$$\Delta\hat{\rho}_{ij} = E\{\Delta\rho_{ij}|N_j^{ni}\} \quad (27)$$

Let $\lambda_{ION}$ denote the two-frequency ionospheric wave length. Then:

$$\Delta\hat{\rho}_{ij} = \lambda_{ION} N_j^{Ei} + c\chi_{ij} + E\{I_j^{Ni}|N_j^{ni}\} + E\{I_j^{U}|N_j^{ni}\} \quad (28)$$

where:

$$\lambda_{ION} = \frac{\lambda_1 \lambda_2}{\lambda_1 + \lambda_2} \quad (29)$$

and where approximately $\lambda_{ION}$=10.69534 cm/cycle, given $\lambda_1$=19.029367 cm/cycle and $\lambda_2$=24.42102 cm/cycle.

First Differences on $N_j^{Ei}$

With respect to first differences on NE, we define:

$$\Delta N_j^E = N_j^{Ep} - N_j^{Eq} \quad (30)$$

where p and q refer to distinct NAVSTARS. Insert Eq. 22 into Eq. 30 to find that $\bar{f}_1^{NV} I_j^{1U}$ and $\bar{f}_2^{NV} I_j^{2U}$ are differenced out. That is, USER clock phase perturbations $I_j^{1U}$ and $I_j^{2U}$ vanish entirely due to first differences $N_j^E$ on ionosphere-free Doppler phase count measurements, and due to our choice of Eq. 6 rather than Eq. 8 for modeling USER clock phenomenology. NAVSTAR clock phase perturbations $I_j^{1Np}$, $I_j^{2Np}$, $I_j^{1Nq}$, and $I_j^{2Nq}$ all survive, and all USER receiver PLL thermal noise perturbations $\delta N_j^{Ni}$ survive.

Serial Correlation Due to Overlapping Doppler Phase Count Measurements

With respect to overlapping carrier phase measurement, one can inspect Eq. 3 for time $t_j = t_1$ to write:

$$N_1^{ni} = \int_{1-\Delta t}^{1} f_n^D dt + \delta N_1^{ni}$$

and for time $t_j = t_2$ to write:

$$N_2^{ni} = \int_{2-\Delta t}^{2} f_n^D dt + \delta N_2^{ni}$$

The overlapping measurement defined by the sum of the two sequential measurements can be represented with:

$$N_1^{ni} + N_2^{ni} = \int_{2-2\Delta t}^{2} f_n^D dt + \delta N_{1,2}^{ni}$$

where:

$$\delta N_{1,2}^{ni} = \delta N_1^{ni} + \delta N_2^{ni}$$

The overlapping measurement defined by the sum of L sequential measurements can be defined with:

$$N_{1,L}^{ni} = N_1^{ni} + N_2^{ni} + \ldots + N_L^{ni}$$

By induction on the positive integers:

$$N_{1,L}^{ni} = \int_{2-L\Delta t}^{2} f_n^D dt + \delta N_{1,L}^{ni}$$

where:

$$\delta N_{1,L}^{ni} = \delta N_1^{ni} + \delta N_2^{ni} + \ldots + \delta N_L^{ni}$$

Thermal Noise

It is important to notice that when overlapped Doppler phase count measurements $N_{1,1}^{ni}$, $N_{1,2}^{ni}$, ..., $N_{1,L}^{ni}$ are processed by any orbit determination or geolocation capability, there is significant serial correlation in these measurements due to thermal noise component $\delta N_1^{ni}$ in $N_{1,1}^{ni}$, $N_{1,2}^{ni}$, ..., $N_{1,L}^{ni}$, also due to thermal noise component $\delta N_2^{ni}$ in overlapped measurements $N_{1,2}^{ni}$, $N_{1,3}^{ni}$, ..., $N_{1,L}^{ni}$, and, by induction on the positive integers, due to thermal noise component $\delta N_k^{ni}$ in overlapped measurements $N_{1,k}^{ni}$, $N_{1,k+1}^{ni}, \ldots, N_{1,L}^{ni}$. The existence of the same thermal noise components in successive overlapped measurements generates serial correlations in the overlapped measurements. Optimal orbit determination requires that these serial correlations be explicitly accounted for when processing overlapped Doppler phase count measurements so that measurement residuals are properly mapped into state estimate corrections in the orbit determination and geolocation capabilities. However, these serial correlations are not accounted for by existing prior art capabilities that process overlapped Doppler phase count measurements.

Absence of Serial Correlation for Sequential Doppler Phase Count Measurements

There is no serial correlation in sequential Doppler phase count measurements due to thermal noise because thermal noise is Gaussian white noise, and white noise is independent with time. That is, white noise has no serial correlation with time.

A method for providing orbit determination and geolocation using sequential GPS Doppler phase count measurements has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A method of refining state estimates of a Global Positioning System (GPS) receiver based upon sequential GPS carrier phase measurements, comprising:

the GPS receiver receives sequential GPS Doppler carrier phase signals from Navigation System with Timing And Ranging (NAVSTAR) transmitter at a defined phase count interval;

the GPS receiver internal clock generates nominal frequencies and derives received frequencies from phase count measurements;

determining a frequency differences to define instantaneous Doppler frequencies in units of cycles per second (Hz);

counting positive zero crossings of the instantaneous Doppler frequencies to measure rational Doppler carrier phase count number in cycles;

calculating an estimated representation of Doppler carrier phase count number;

differencing measured and estimated representations of Doppler carrier phase count number to obtain measurement residuals;

mapping the measurement residuals to state estimate corrections sequentially; and applying the state estimate corrections to propagated state estimates.

2. The method of claim 1, wherein the state estimates comprise a state estimate structure that contains GPS receiver position, GPS receiver velocity, and GPS receiver clock parameters.

3. The method of claim 1, further comprising eliminating cycle slip by autonomous identification and rejection of any sequential carrier phase measurement that suffers loss of phase lock.

4. The method of claim 3, further comprising continuing processing with a next acceptable sequential carrier phase measurement.

5. The method of claim 1, further comprising processing the state estimates in a sequential filter or a sequential smoother.

* * * * *